A. SPERDUTI.
TRACTOR GEARING.
APPLICATION FILED NOV. 18, 1916.
1,258,489.
Patented Mar. 5, 1918.
3 SHEETS—SHEET 2.
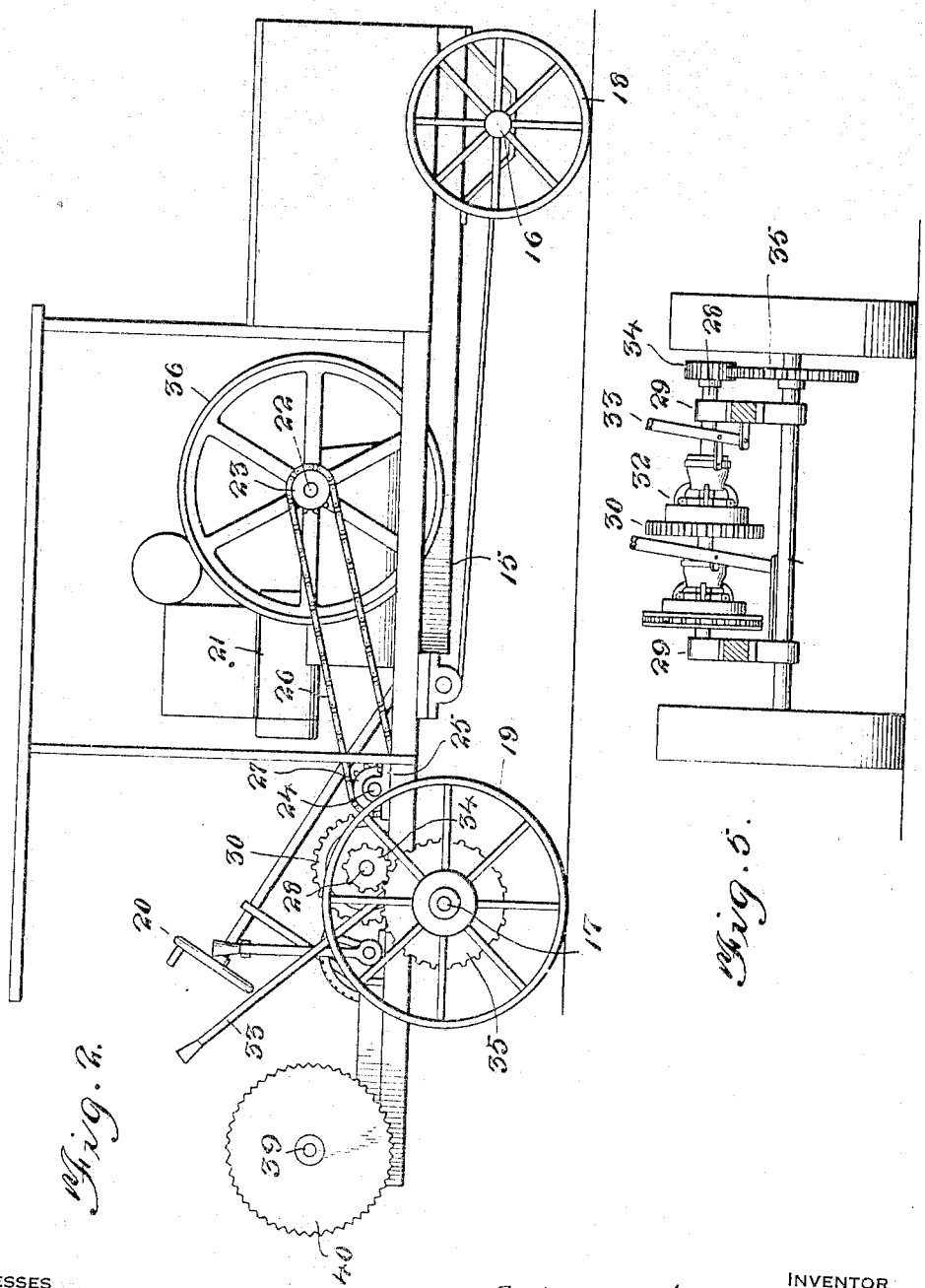
INVENTOR
Antonio Sperduti
BY Victor J. Evans
ATTORNEY

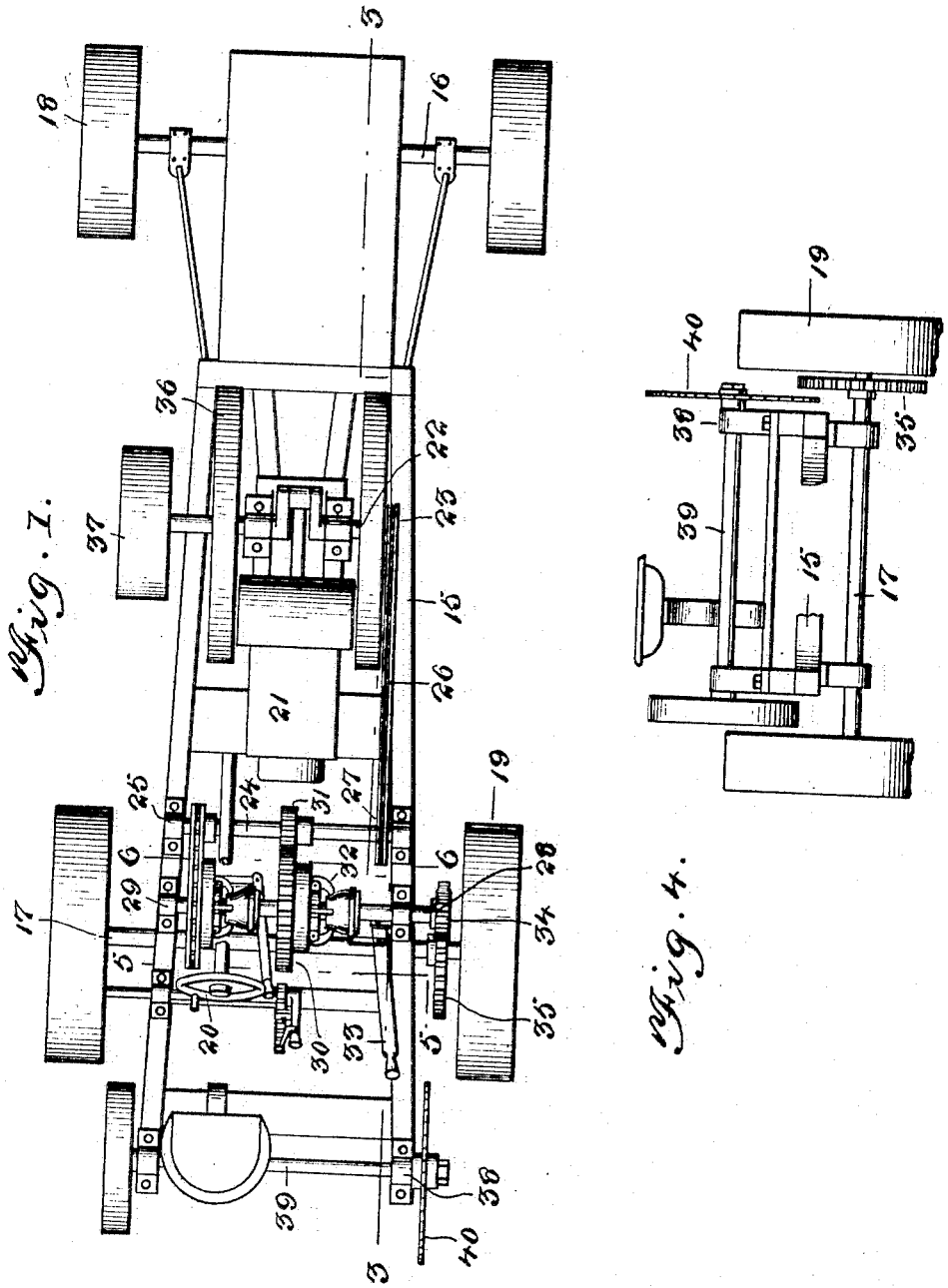

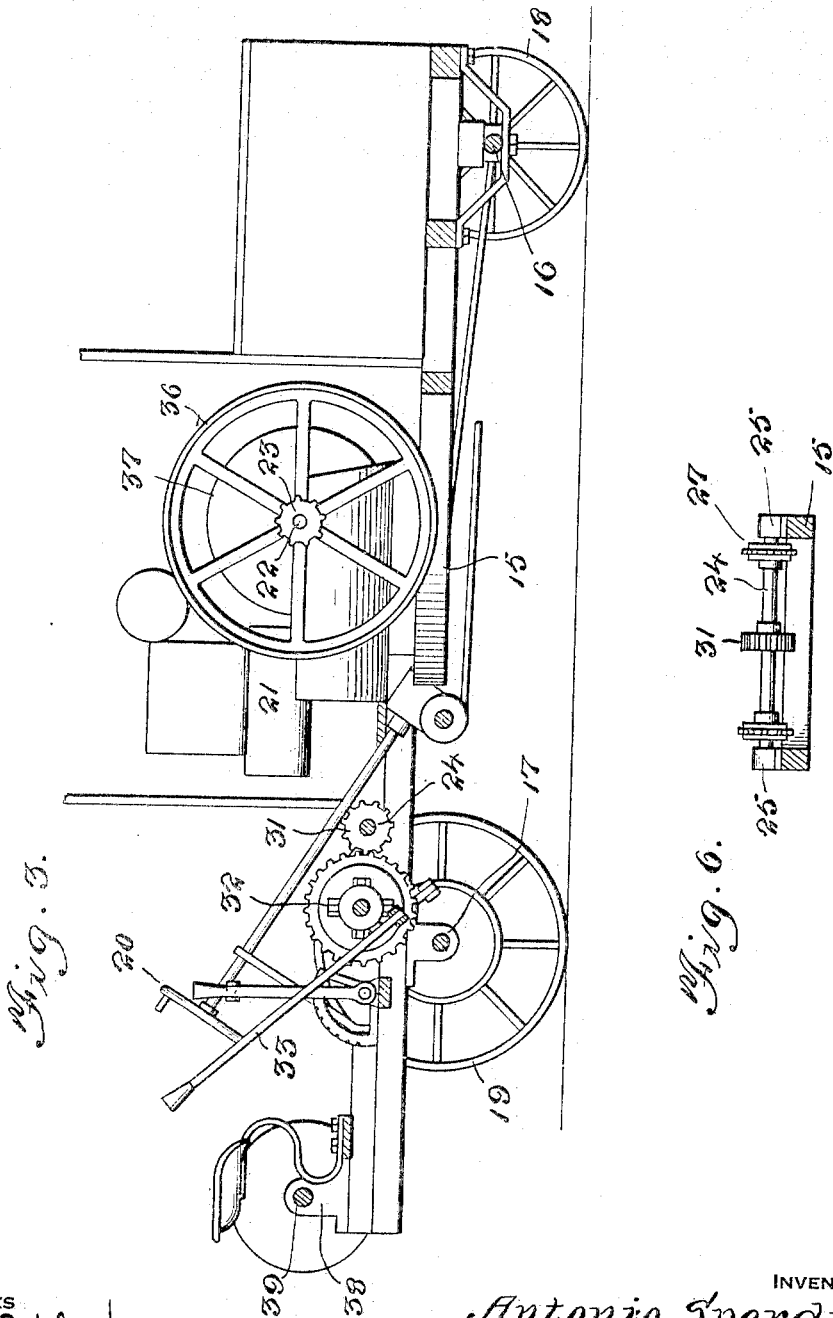

UNITED STATES PATENT OFFICE.

ANTONIO SPERDUTI, OF SAYRE, PENNSYLVANIA.

TRACTOR-GEARING.

1,258,489.  Specification of Letters Patent.  Patented Mar. 5, 1918.

Application filed November 18, 1916. Serial No. 132,144.

*To all whom it may concern:*

Be it known that I, ANTONIO SPERDUTI, a citizen of the United States, residing at Sayre, in the county of Bradford and State of Pennsylvania, have invented new and useful Improvements in Tractor-Gearing, of which the following is a specification.

This invention relates to tractors for farm and general use, and it has for its object to simplify and improve the general construction, assemblage and operation of the same.

A further object of the invention is to simplify and improve means whereby power is transmitted from the motor to the driving wheels of the tractor, and the means whereby such transmission means is controlled.

A further object of the invention is to produce a tractor of simple and improved construction which may also be readily utilized as a stationary engine for operating a saw or other machinery.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,—

Figure 1 is a top plan view of a tractor constructed in accordance with the invention.

Fig. 2 is a side elevation of the same.

Fig. 3 is a longitudinal sectional view taken on the line 3—3 in Fig. 1.

Fig. 4 is a rear elevation.

Figs. 5 and 6 are transverse sectional views taken, respectively, on the lines 5—5 and 6—6 in Fig. 1.

Corresponding parts in the several figures are denoted by like characters of reference.

The frame 15 of the improved machine is mounted on front and rear axles 16, 17, the front axle, which is pivotally connected with the frame, carrying the steering wheels 18, while the rear axle is equipped with traction wheels 19. A conventional steering gear is provided, the same being controlled by a hand wheel 20. A motor 21 of any approved type is installed on the frame 15.

The crank shaft 22 of the motor carries a sprocket wheel 23. A counter shaft 24, which is mounted in bearings 25 on the frame, is driven from the crank shaft by a chain 26 which is trained over the sprocket wheel 23 and over a sprocket wheel 27 on the said counter shaft. A control shaft 28 is journaled in bearings 29 on the side members of the frame, said control shaft extending parallel to the counter shaft 24. Mounted loosely on the shaft 28 is a large gear wheel 30 which meshes with a smaller gear wheel or pinion 31 which is fixed upon and rotatable with the shaft 24. The gear wheel 30 will thus constantly be in a state of rotation while the motor 21 is in operation. For the purpose of rotating the shaft 28 in unison with the gear wheel 30 there is provided a manually controlled clutch 32 of a well known friction type, said clutch being operable by a lever 33 by means of which the gear wheel 30 may be clamped to the shaft 28 for simultaneous rotation therewith, it being obvious that by moving the lever 33 in an opposite direction, the clutch will be released, thereby releasing the gear wheel 30 from the shaft 28.

Securely mounted on the control shaft 28 for rotation therewith is a spur wheel 34 which meshes with a gear wheel 35, the same being carried upon and rotatable with the rear axle 17 to which the traction wheels 19 are secured. It follows that when the clutch 22 is "set", power will be transmitted from the motor to the traction wheels through the medium of the transmission means above described. It is obvious that reversing gears of well known type may be employed in order that the rotation of the control shaft 28 may be reversed. Such reversing gear, however, is well known, and it is not deemed necessary to particularly illustrate or describe the same.

Mounted on the crank shaft 22 of the motor are fly wheels or balance wheels 36, and said crank shaft also carries a pulley 37 from which motion may be transmitted to any machinery or mechanism that it may be desired to drive. Such machinery or mechanism may be installed anywhere, and the machine of the present invention may thus be utilized as a portable engine to furnish power for various purposes. The frame of the machine has also been shown as being provided with bearings 38 for a shaft or arbor 39 carrying a circular saw 40 which may be driven by direct or indirect transmission from the crank shaft of the engine, thus enabling the machine of the present invention to be utilized as a portable wood sawing machine.

From the foregoing description taken in connection with the drawings hereto annexed, it will be seen that I have produced a very simple and effective machine which may be utilized not only as a tractor for farm or for general purposes, but also as a stationary or as a portable engine designed to supply power for a variety of purposes.

Having thus described the invention, what is claimed as new, is:—

A gearing, including a driving shaft, a driven shaft, and a control shaft having fixed gearing coöperation with the driven shaft at all times, a gear pinion fixed centrally on the driving shaft, a gear mounted loosely and centrally of the control shaft and in constant mesh with the gear pinion, and a clutch mounted on the control shaft and coöperating with the loose gear for fixing the same with respect to the control shaft, the power for the driving shaft and the connection between the driven and control shafts being on the same side of the connection between the driving and control shafts.

In testimony whereof I affix my signature.

ANTONIO SPERDUTI.

Copies of this patent may be obtained for five cents each, by addressing the "Commissioner of Patents, Washington, D. C."